US009287698B2

(12) United States Patent
Oguchi et al.

(10) Patent No.: US 9,287,698 B2
(45) Date of Patent: Mar. 15, 2016

(54) POWER CONVERSION APPARATUS (75) Inventors: Hideki Oguchi, Hino (JP); Akio Toba, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 190 days.

(21) Appl. No.: 13/993,604

(22) PCT Filed: Dec. 21, 2011

(86) PCT No.: PCT/JP2011/079602
§ 371 (c)(1),
(2), (4) Date: Jul. 15, 2013

(87) PCT Pub. No.: WO2012/086674
PCT Pub. Date: Jun. 28, 2012

(65) Prior Publication Data
US 2013/0286514 A1 Oct. 31, 2013

(30) Foreign Application Priority Data
Dec. 22, 2010 (JP) .................................. 2010-285260

(51) Int. Cl.
H02H 7/08 (2006.01)
B60L 3/00 (2006.01)
(Continued)

(52) U.S. Cl.
CPC .............. *H02H 7/0833* (2013.01); *B60L 3/003* (2013.01); *B60L 3/04* (2013.01); *B60L 7/14* (2013.01); *B60L 11/126* (2013.01); *B60L 11/1803* (2013.01); *H02H 3/08* (2013.01); *H02P 3/18* (2013.01); *H02P 3/26* (2013.01);
(Continued)

(58) Field of Classification Search
CPC ....... B66B 1/285; B66B 1/308; B60L 11/126; B60L 11/1803; B60L 2210/40; B60L 2220/14; B60L 2240/421; B60L 2240/529; B60L 3/04; B60L 7/14; H02H 3/08; H02H 7/0833; H02P 3/18; H02P 3/26; Y02T 10/6217; Y02T 10/642; Y02T 10/7005; Y02T 10/7022
USPC .............. 361/31, 19, 15, 20, 23, 51; 318/432, 318/434, 727, 800, 801, 823, 825; 187/283, 187/295, 393; 188/180
See application file for complete search history.

(56) References Cited

U.S. PATENT DOCUMENTS 4,314,191 A * 2/1982 Kawada et al. ................ 318/802
4,525,600 A * 6/1985 Hashimoto ...................... 379/70
(Continued)

FOREIGN PATENT DOCUMENTS

JP 09-327192 12/1997
JP 11-352276 A 12/1999
(Continued)

*Primary Examiner* — Rita Leykin
(74) *Attorney, Agent, or Firm* — Rabin & Berdo, P.C.

(57) ABSTRACT

A controller for switching an inverter includes a current detecting unit, an overcurrent level determining unit which determines an overcurrent level for stopping the inverter in accordance with a value corresponding to the number of revolutions of a motor, a current comparing unit which compares a detected output current value of the inverter with the overcurrent level, and a gate signal generating unit which generates a signal for turning off all semiconductor switching devices of the inverter when the current comparing unit makes a determination that the detected output current value has reached the overcurrent level. The overcurrent level is lowered as the number of revolutions of the motor increases.

19 Claims, 12 Drawing Sheets (51) Int. Cl.
  *B60L 3/04* (2006.01)
  *B60L 7/14* (2006.01)
  *B60L 11/12* (2006.01)
  *B60L 11/18* (2006.01)
  *H02P 3/18* (2006.01)
  *H02P 3/26* (2006.01)
  *H02H 3/08* (2006.01)

(52) U.S. Cl.
  CPC ......... *B60L 2210/40* (2013.01); *B60L 2220/14* (2013.01); *B60L 2240/421* (2013.01); *B60L 2240/529* (2013.01); *Y02T 10/6217* (2013.01); *Y02T 10/642* (2013.01); *Y02T 10/7005* (2013.01); *Y02T 10/7022* (2013.01); *Y02T 10/7077* (2013.01); *Y02T 10/7241* (2013.01)

(56) References Cited

U.S. PATENT DOCUMENTS

| | | | | |
|---|---|---|---|---|
| 4,812,729 | A * | 3/1989 | Ito et al. | 318/732 |
| 5,325,258 | A * | 6/1994 | Choi | H03K 17/0828 323/276 |
| 5,825,597 | A * | 10/1998 | Young | 361/31 |
| 5,936,372 | A | 8/1999 | Nashiki et al. | |
| 6,009,003 | A * | 12/1999 | Yeo | 363/37 |
| 6,215,262 | B1 * | 4/2001 | Lim | 318/400.09 |
| 6,324,038 | B1 * | 11/2001 | Kishibe et al. | 361/31 |
| 6,538,404 | B2 * | 3/2003 | Kato | H02M 7/53871 318/139 |
| 7,218,496 | B2 * | 5/2007 | Kitagawa | H03K 17/0822 361/93.1 |
| 7,355,826 | B2 * | 4/2008 | Ochiai et al. | 361/23 |
| 7,486,038 | B2 * | 2/2009 | Amagasa | 318/400.21 |
| 7,626,793 | B2 * | 12/2009 | Kaya et al. | 361/93.1 |
| 7,911,168 | B2 * | 3/2011 | Koike | 318/432 |
| 8,125,169 | B2 * | 2/2012 | Ogino et al. | 318/400.03 |
| 8,350,508 | B2 * | 1/2013 | Celik | A47L 5/26 318/400.01 |
| 2002/0109479 | A1 | 8/2002 | Kishibe et al. | |
| 2004/0135533 | A1 | 7/2004 | Harakawa et al. | |
| 2010/0253250 | A1 * | 10/2010 | Marvelly | H02P 6/008 318/3 |

FOREIGN PATENT DOCUMENTS

| | | |
|---|---|---|
| JP | 2001-268973 A | 9/2001 |
| JP | 3773798 B2 | 5/2006 |
| JP | 2006-211831 A | 8/2006 |
| JP | 2010-162672 A | 7/2010 |
| WO | WO-03/009463 A1 | 1/2003 |

* cited by examiner

| NUMBER OF REVOLUTIONS [r/min.] | OVERCURRENT LEVEL [%] |
|---|---|
| 0~2000 | 300 |
| 2000~3000 | 250 |
| 3000~4000 | 200 |
| 4000~5000 | 150 |
| 5000~6000 | 100 |

| NUMBER OF REVOLUTIONS [r/min.] | OVERCURRENT LEVEL [%] | CURRENT LIMIT LEVEL [%] |
|---|---|---|
| 0~2000 | 300 | 250 |
| 2000~3000 | 250 | 200 |
| 3000~4000 | 200 | 150 |
| 4000~5000 | 150 | 100 |
| 5000~6000 | 100 | 50 |

POWER CONVERSION APPARATUS

BACKGROUND

1. Technical Field

The present invention relates to a power conversion apparatus having a function of protecting a motor drive inverter from an overcurrent.

2. Background Art

Generally, an overcurrent protection function is provided in an inverter for the purpose of protecting the inverter from an overcurrent. Although an overcurrent detection level in this case can be determined in accordance with an allowable current of semiconductor switching devices such as IGBT's (Insulated Gate Bipolar Transistors) which are constituent parts of the inverter, the overcurrent detection level is generally fixed in an inverter for a variable speed use.

Figure 7:
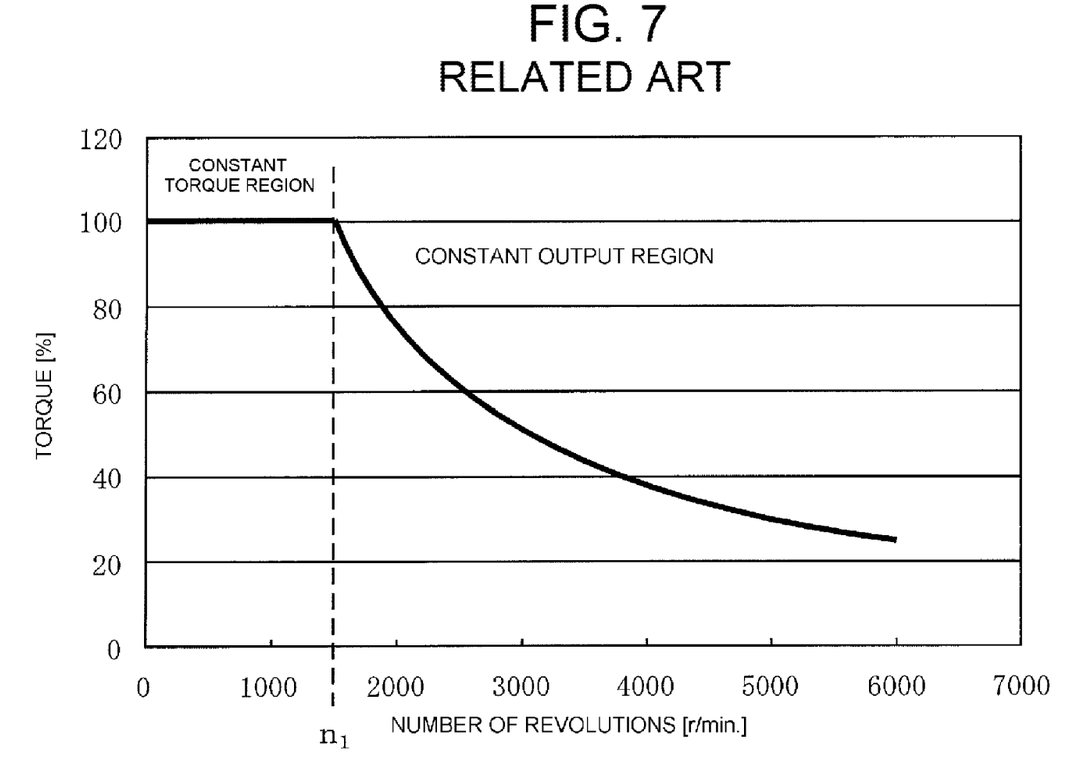
FIG. 7 is a graph showing the relation between the number of revolutions of a motor and torque.

Almost all vehicle drive motors in hybrid automobiles or electric automobiles are controlled in such a manner that a constant torque region in which the torque is constant is provided when the number of revolutions is less than a certain revolution number $n_1$ (e.g. $n_1$=1500 [r/min.]), and that a constant output region in which the output is constant is provided when the number of revolutions is equal to or larger than the revolution number $n_1$, as shown in FIG. 7. When a permanent magnet synchronous motor such as an interior permanent magnet synchronous motor is used as this type motor, the current is not completely proportional to the torque but decreases as the necessary torque decreases. That is, according to the characteristic of FIG. 7, the current decreases as the number of revolutions increases.

Consider now the case where a state in which the current of the motor reaches 300[%] of the rated current is detected as an overcurrent. If a permanent magnet synchronous motor is used, the no-load induced voltage in the case where the number of revolutions is 6000 [r/min.] is four times as large as that in the case where the number of revolutions is 1500 [r/min.]. That is, when the inverter is stopped in an emergency during overcurrent detection, regenerative energy becomes larger as the motor rotates at a higher speed. When the inverter is stopped in an emergency in this manner during high-speed rotation of the motor, large energy is regenerated to a DC-side capacitor of the inverter. As a result, there is a possibility that the capacitor will be broken down by an overvoltage applied on the capacitor.

Here, when all gates of the inverter are shut off to stop the inverter in an emergency while the motor rotates, the state in which the voltage of the capacitor increases is confirmed by a simulation and a result thereof will be therefore described.

Figure 8:
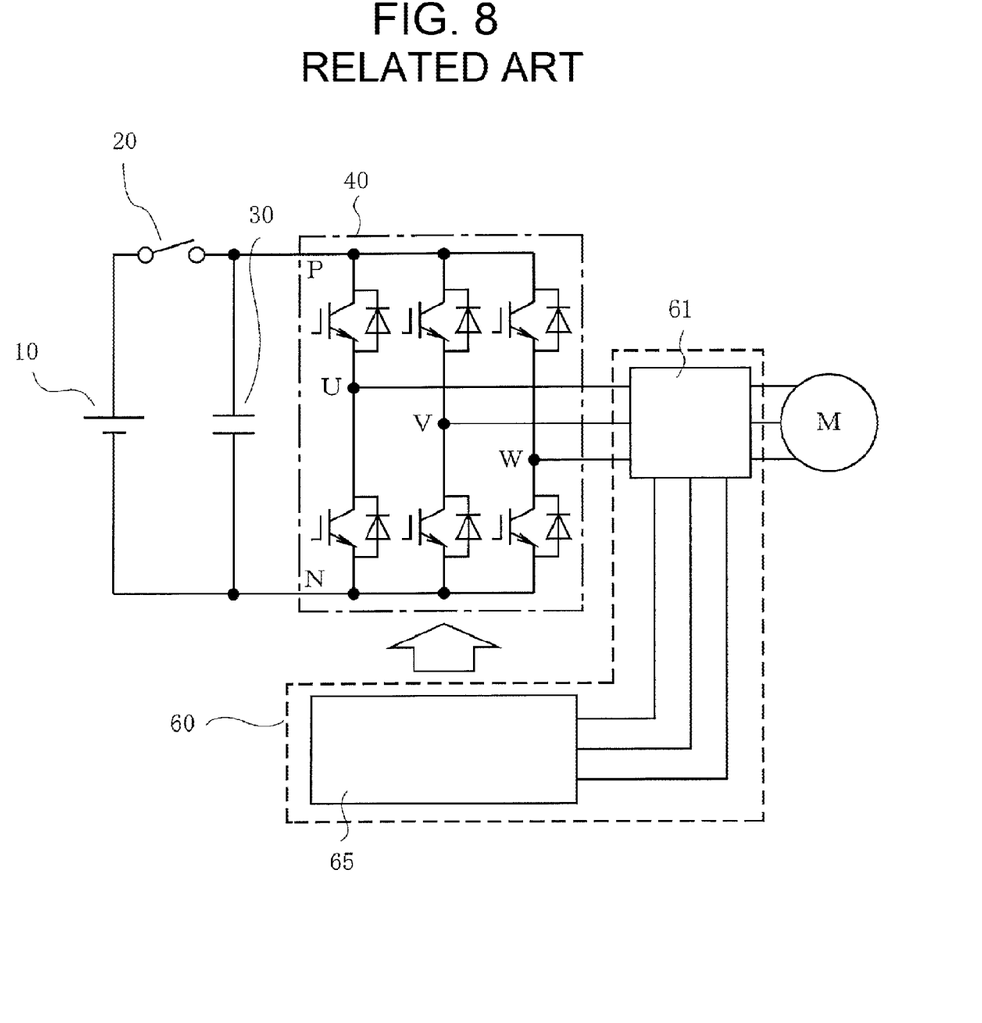
FIG. 8 is a circuit diagram of a power conversion apparatus used in a simulation.

FIG. 8 is a circuit diagram of a power conversion apparatus used in the simulation. In FIG. 8, the reference sign 10 designates a DC power supply; 20, a power supply cut-off switch; 30, a capacitor; 40, a three-phase voltage type inverter having semiconductor switching devices bridge-connected; 60, a controller; 61, a current detecting unit; 65, a gate signal generating unit; M, a three-phase motor driven by the inverter 40; P and N, DC input terminals of the inverter 40; and U, V and W, AC output terminals.

In FIG. 8, the power supply cut-off switch 20 is opened in the condition that the motor M is driven by the inverter 40 and, at the same time, all the semiconductor switching devices of the inverter 40 are turned off (all the gates are shut off) by the gate signal generating unit 65. Incidentally, the rated output of the motor M is 20 [kW], the no-load induced voltage at the revolution speed of 8000 [r/min.] is 519 [V], the rated current is 60 [A], the DC intermediate voltage (the voltage of the capacitor 30) is 650 [V], and the capacitance value of the capacitor 30 is 400 [μF].

Figure 9:
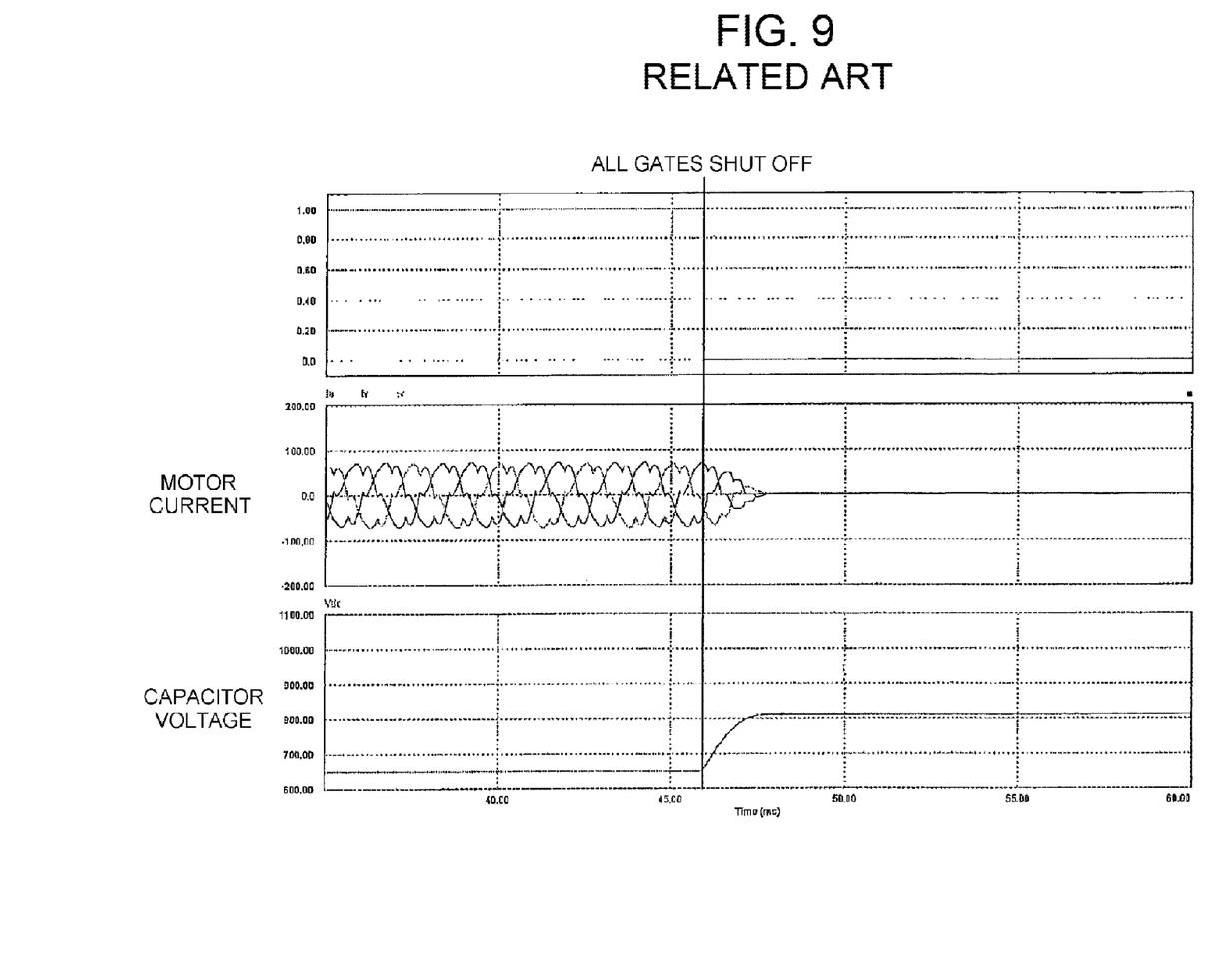
FIG. 9 is a waveform chart showing a simulation result in the case where all gates of an inverter are shut off.

FIG. 9 is a simulation result when all the gates are shut off while the motor M is operated at 40 [kW] which is twice as large as the rated output. The current of the motor M is 49 [A] (about 82[%] of the rated current). It is found from FIG. 9 that the voltage of the capacitor 30 increases to about 812 [V] because all the gates are shut off.

Figure 10:
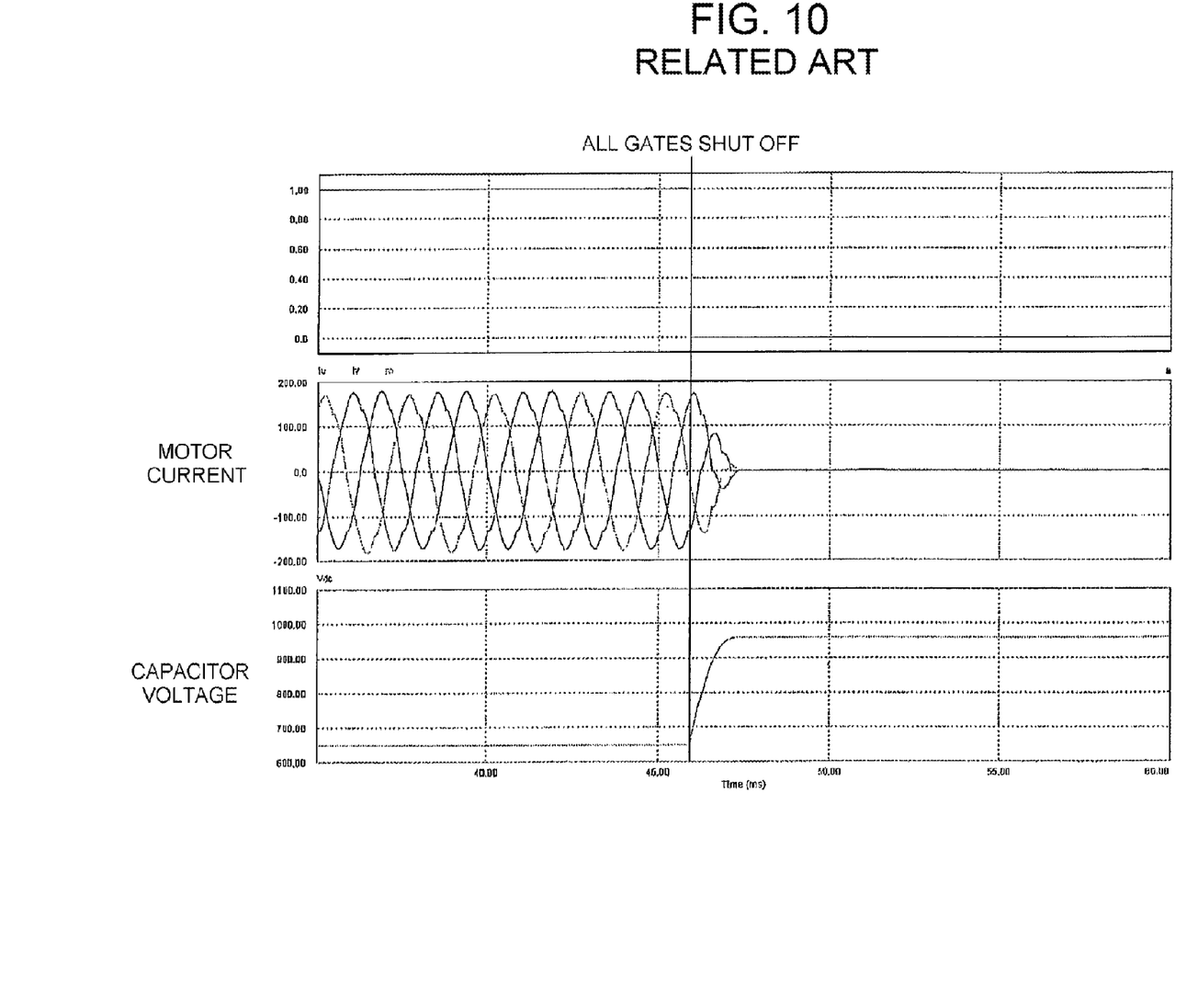
FIG. 10 is a waveform chart showing a simulation result in the case where all the gates of the inverter are shut off.

Next, FIG. 10 is a simulation result when all the gates are shut off while the motor M is operated at 120 [A] which is twice as large as the rated current. It is found from FIG. 10 that the voltage of the capacitor 30 increases to about 961 [V] because all the gates are shut off.

As described above, when all the gates of the inverter 40 are shut off while the motor M rotates at a high speed, a high voltage is applied on the capacitor 30. Accordingly, assuming that, for example, the withstand voltage of the capacitor 30 is 900 [V], then there is a possibility that the capacitor 30 will be broken down because a voltage not lower than the withstand voltage is applied on the capacitor 30 when all the gates are shut off in the case as shown in FIG. 10.

Some inverters have a current limiting function in addition to the overcurrent protection function. Here, the current limiting function is a function by which the current is suppressed so that a current equal to or larger than a preset current limit level does not flow while operation of the inverter is continued.

As a background-art technique provided with the current limiting function, there is known a power conversion apparatus described in PTL 1 (identified further on). The power conversion apparatus has a function of adjusting a current limit level so that an inverter is not stopped due to an overcurrent when failure such as momentary interruption of an AC power supply (hereinafter referred to as "momentary interruption" simply) occurs and power is then recovered to restart a motor.

Figure 11:
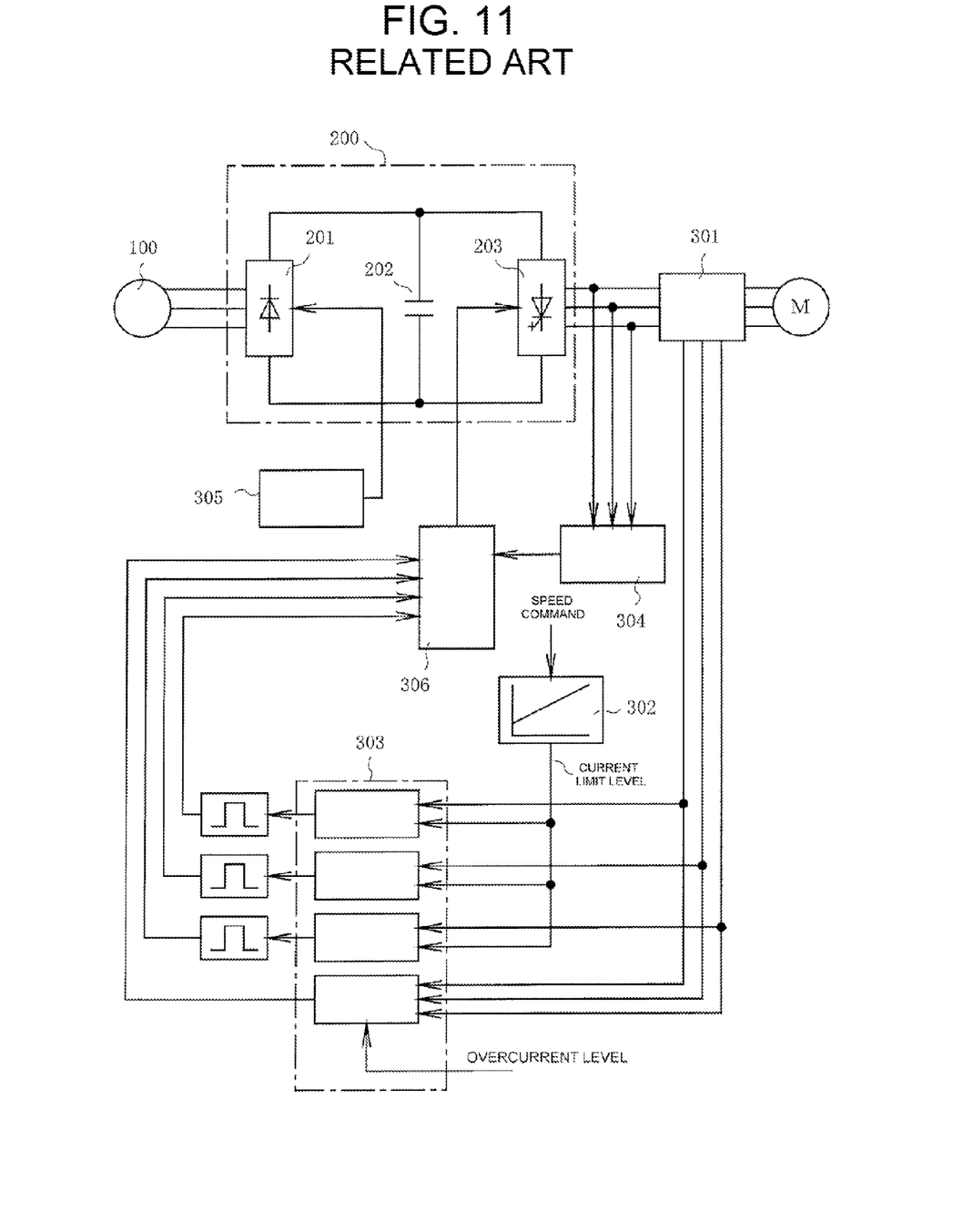
FIG. 11 is a circuit diagram of a background-art technique according to PTL 1.

FIG. 11 shows the background-art technique according to PTL 1. The reference sign 100 designates an AC power supply; 200, a main circuit part of a power conversion apparatus; 201, a rectifier circuit; 202, a capacitor; 203, an inverter circuit; 301, a current detector; 302, a current limit level calculator; 303, a comparison device; 304, a phase detector; and 305 and 306, gate controllers.

Operation of FIG. 11 will be described briefly as follows. When, for example, failure such as momentary interruption of the AC power supply 100 occurs, the gate controller 305 stops the rectifier circuit 201 and the gate controller 306 stops the inverter circuit 203. In addition, the gate controller 306 calculates a frequency command of the inverter circuit 203 for restarting, based on the phase of the motor M detected by the phase detector 304. When the power of the AC power supply 100 is then recovered, the gate controllers 305 and 306 restart the rectifier circuit 201 and the inverter circuit 203.

On this occasion, the comparison device 303 compares an output current of the inverter circuit 203 with a current limit level calculated from a predetermined function by the current limit level calculator 302 in accordance with each phase based on a speed command. The gate controller 306 gate-blocks only the phase which has reached the current limit level for a predetermined period to thereby prevent the output current of the inverter circuit 203 at the phase from becoming excessive.

In this manner, even when the current at a certain phase reaches the current limit level, the power conversion apparatus can be operated continuously.

CITATION LIST

Patent Literature

PTL 1: Japanese Patent No. 3773798 (paragraphs [0012]-[0014], FIGS. 1 and 2)

Technical Problem

Figure 12:
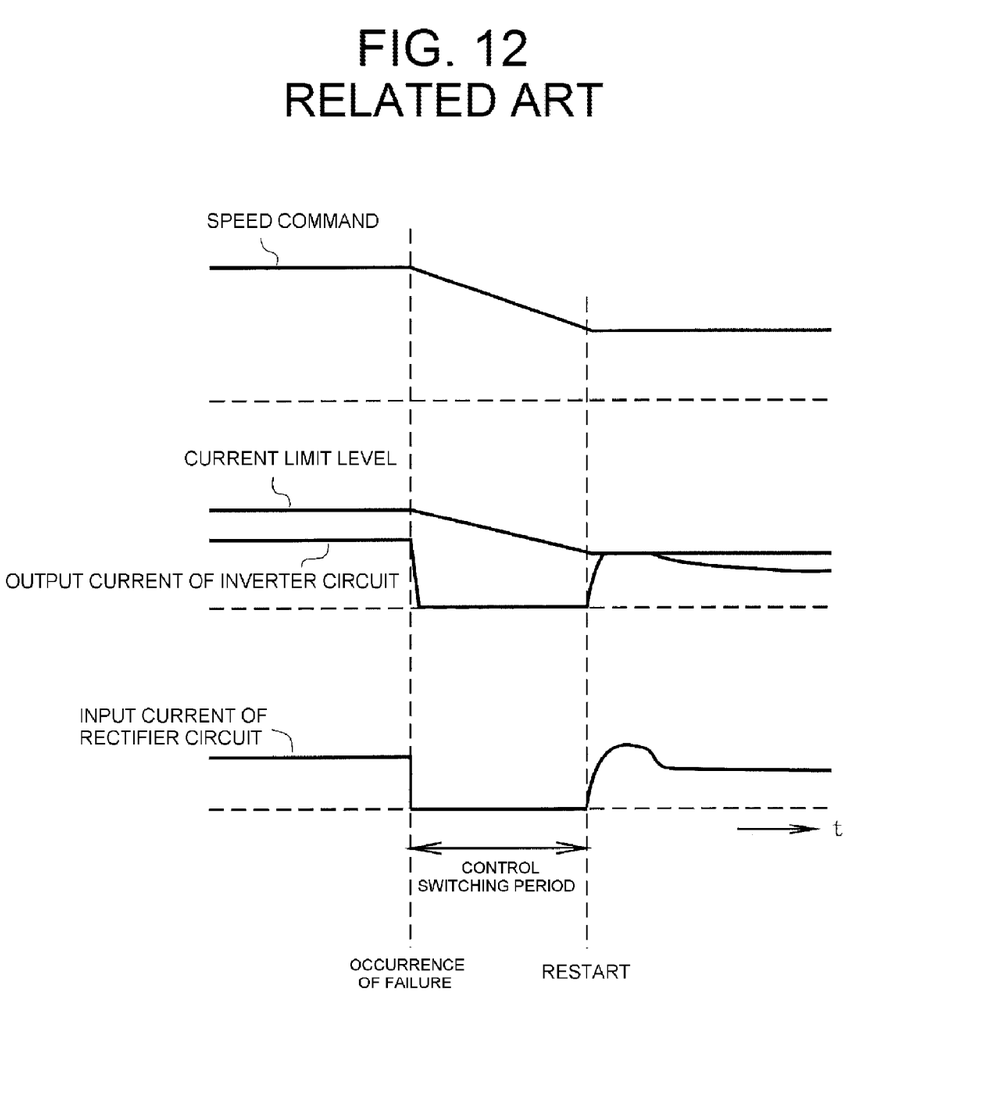
FIG. 12 is a waveform chart showing operation of the circuit in FIG. 11.

FIG. 12 is a waveform chart showing the speed command, the current limit level, the output current of the inverter circuit, and the input current of the rectifier circuit in PTL 1. The "control switching period" in FIG. 12 indicates a period from occurrence of failure due to momentary interruption etc. to restart.

As is apparent from FIG. 12, the current limit level changes with the same tendency as the speed command in PTL 1.

Here, in the vehicle drive system for a hybrid automobile or an electric automobile, when current limiting is imposed at the restart of the motor drive inverter, large torque is not required while the motor rotates at a high speed, so that the current value of the motor may be small. However, as shown in FIG. 12, when the current limit level is determined in accordance with the size of the speed command, the current limit level becomes large as the speed command becomes large, so that the output current of the inverter circuit 203 at the time of restart also becomes large.

Accordingly, because the method for determining the current limit level according to the background art is not proper and allows an output current larger than necessary at the time of restart, there is a problem that the method is wasteful.

Therefore, an object of the invention is to provide a power conversion apparatus which is configured so that an overcurrent level of an inverter is changed in accordance with the rotation speed of a motor to prevent a DC-side capacitor from being broken down by the overvoltage when the inverter is stopped in an emergency during high-speed rotation of the motor.

Another object of the invention is to provide a power conversion apparatus which can determine a current limit level most suitable to a vehicle drive system for a hybrid automobile or an electric automobile.

SUMMARY

In order to achieve the foregoing objects, the invention is applied to a power conversion apparatus in which, for example, a permanent magnet synchronous motor is driven by an inverter having a DC side to which a parallel circuit having a DC power supply and a capacitor is connected. Particularly, the power conversion apparatus according to the invention is preferably applied to a vehicle drive system for a hybrid automobile or an electric automobile.

In the invention, a controller for controlling semiconductor switching devices of the inverter has a current detecting unit, an overcurrent level determining unit, a current comparing unit and a drive signal generating unit, and may further have a current limit level determining unit if occasion demands.

The current detecting unit detects an output current of the inverter. The overcurrent level determining unit determines an overcurrent level for stopping operation of the inverter in accordance with a value corresponding to the number of revolutions of the motor. Here, the value corresponding to the number of revolutions of the motor may be any one of a detected value of the number of revolutions, an estimated value of the number of revolutions or a commanded value of the number of revolutions of the motor.

The current comparing unit compares a detected output current value of the inverter outputted from the current detecting unit with the overcurrent level determined by the overcurrent level determining unit. When the current limit level determining unit is provided, the detected output current value is further compared with a current limit level.

The current limit level determining unit determines a current limit level for limiting the output current of the inverter in accordance with the value corresponding to the number of revolutions of the motor.

The drive signal generating unit generates a signal for turning off all the semiconductor switching devices of the inverter when the current comparing unit makes determination that the detected output current value has reached the overcurrent level. The drive signal generating unit further generates a signal for limiting the output current of the inverter at a certain phase when the current comparing unit makes determination that the detected output current value at the phase has reached the current limit level. Here, to limit the output current, switching at the phase may be stopped or the width of a pulse for turning on the semiconductor switching devices at the phase may be shortened.

It is desirable that the overcurrent level and the current limit level become lower in terms of value as the value corresponding to the number of revolutions becomes higher in a constant output region of the motor. In addition, it is desirable that the current limit level is lower in terms of value than the overcurrent level in the whole range of the value corresponding to the number of revolutions of the motor.

Advantage Effects of Invention

According to the invention, the overcurrent level and the current limit level for protecting the inverter are reduced as the number of revolutions of the motor increases. Thus, regenerative energy generated when the inverter is stopped in an emergency during high-speed rotation of the motor can be reduced so that the voltage applied on the DC-side capacitor can be reduced to prevent the capacitor from being broken down.

By setting the current limit level to be lower than the overcurrent level, a current larger than necessary is prevented from flowing in the motor when the inverter is restarted after an emergency stop. Thus, there is an effect that the loss is reduced to improve the efficiency.

DETAILED DESCRIPTION

Embodiments of the invention will be described below in accordance with the drawings. First, FIG. 1 is a circuit diagram showing a first embodiment of the invention.

Figure 1:
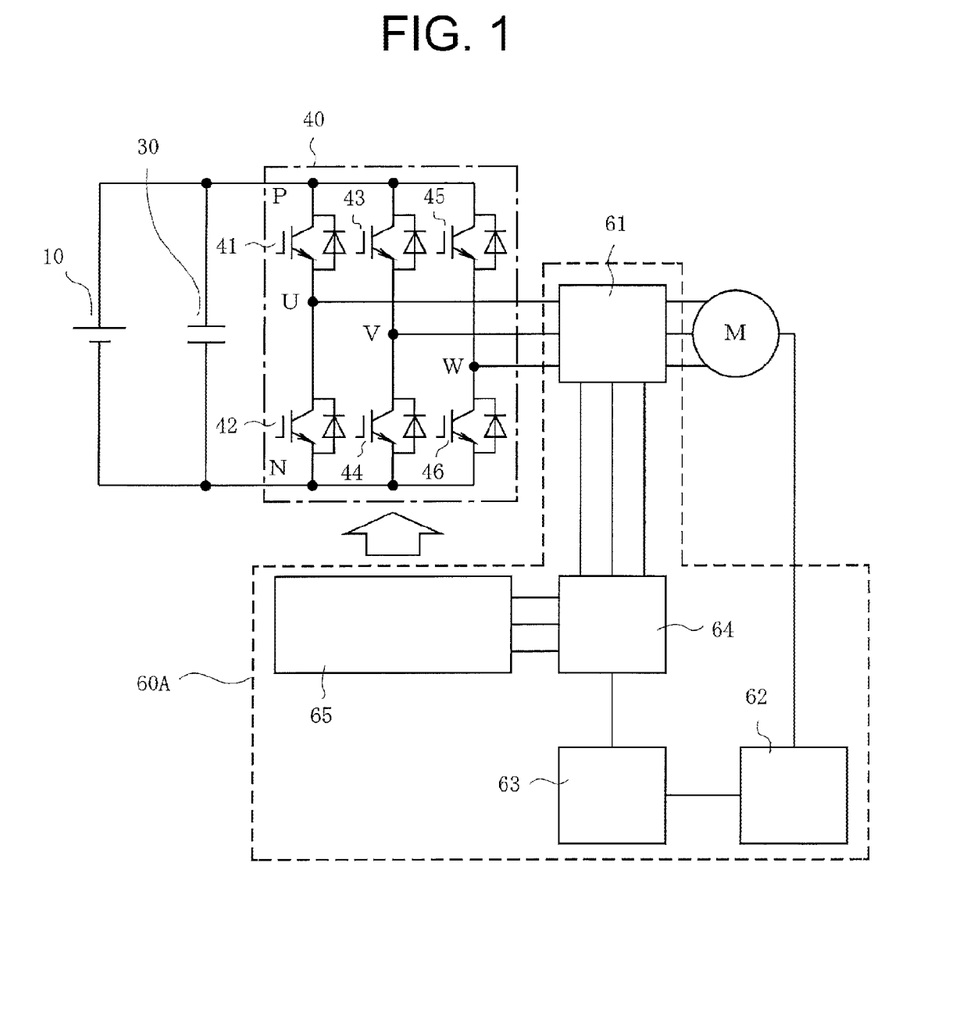
FIG. 1 is a circuit diagram showing a first embodiment of the invention.

In FIG. 1, the reference sign 10 designates a DC power supply such as a battery which is provided so that a capacitor 30 is connected between opposite ends of the DC power supply. DC input terminals P and N of a voltage type inverter 40 are connected to opposite ends of a parallel circuit having the DC power supply 10 and the capacitor 30. The inverter 40 is formed so that semiconductor switching devices 41 to 46 such as IGBT's (Insulated Gate Bipolar Transistors) provided with free wheel diodes respectively are bridge-connected. The semiconductor switching devices are not limited to IGBT's but may be ordinary bipolar transistors, FET's (Field Effect Transistors) or the like.

AC output terminals U, V and W of the inverter 40 are connected to respective phase input terminals of a three-phase motor M through a current detecting unit 61 such as a current transformer. Here, the motor M is, for example, an interior permanent magnet synchronous motor.

A controller 60A is provided for turning on/off the semiconductor switching devices 41 to 46 of the inverter 40. The controller 60A includes the current detecting unit 61, a revolution number detecting unit 62, an overcurrent level determining unit 63, a current comparing unit 64, and a gate signal generating unit 65 serving as a drive signal generating unit. Incidentally, a main part of the controller 60A can be achieved by a CPU (Central Processing Unit) or DSP (Digital Signal Processor) and a predetermined program.

The current detecting unit 61 detects an output current of the inverter 40 phase by phase. The revolution number detecting unit 62 detects the number of revolutions of the motor M. The overcurrent level determining unit 63 determines an overcurrent level in accordance with the number of revolutions of the motor M as will be described later. The current comparing unit 64 compares the overcurrent level with a current value detected by the current detecting unit 61 phase by phase so that an overcurrent detection signal is outputted to the gate signal generating unit 65 when the output current of the inverter 40 has reached the overcurrent level.

Upon reception of the overcurrent detection signal, the gate signal generating unit 65 generates and outputs a gate signal for shutting off all the gates of the inverter 40.

Although the first embodiment shows the case where the number of revolutions of the motor M is detected by the revolution number detecting unit 62, the number of revolutions may be estimated by a well-known method, such as a method of estimating the number of revolutions based on an induced voltage of the motor M, so that the estimated value of the number of revolutions may be inputted to the overcurrent level determining unit 63 when so-called sensorless control is performed without use of the revolution number detecting unit 62. A commanded value of the number of revolutions may be inputted to the overcurrent level determining unit 63 in place of the detected value of the number of revolutions or the estimated value of the number of revolutions.

Figure 2:
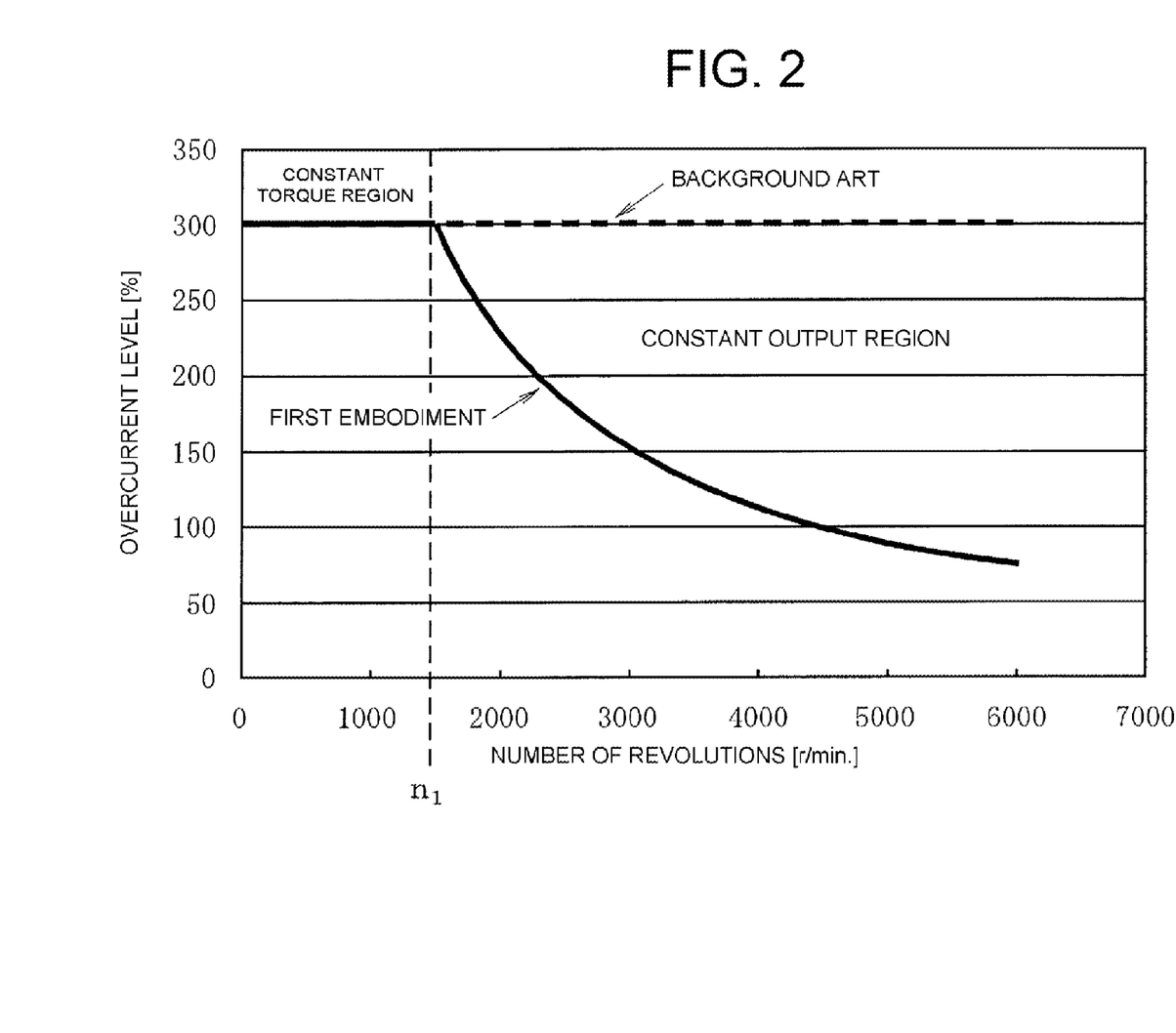
FIG. 2 is a graph showing the relation between the number of revolutions of a motor and an overcurrent level in the first embodiment.
Figure 3:
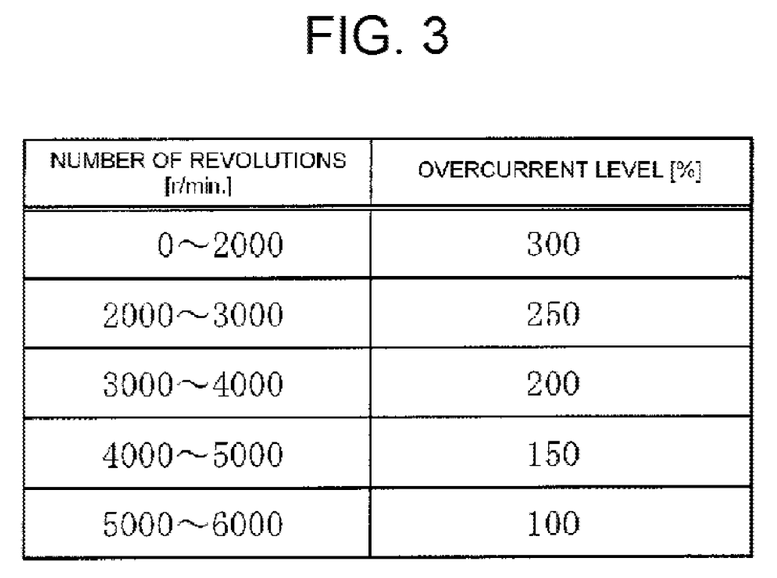
FIG. 3 is a table showing the relation between the number of revolutions of the motor and the overcurrent level in the first embodiment.

FIGS. 2 and 3 show the relation between the number of revolutions of the motor M and the overcurrent level in the first embodiment.

Characteristic shown in FIG. 2 is similar to revolution number-torque characteristic in FIG. 7. For example, the characteristic is provided so that 300% of the rated current is regarded as an overcurrent level in a constant torque region where the number of revolutions is less than a predetermined value ($n_1$=1500 [r/min.]), and that the overcurrent level is reduced with the increase of the number of revolutions in a constant output region where the number of revolutions is equal to or larger than $n_1$.

FIG. 3 shows an example for determining the overcurrent level in accordance with the revolution number range. For example, FIG. 3 shows the example where 300[%] of the rated current is regarded as an overcurrent level in a revolution number range of 0 to 2000 [r/min.], and then, the overcurrent level is reduced by 50[%] of the rated current whenever the number of revolutions increases by 1000 [r/min.].

The characteristics (the overcurrent level in accordance with the number of revolutions) shown in FIGS. 2 and 3 are stored in advance as numerical data or a table in a memory (not shown) provided in the controller 60A in FIG. 1. The overcurrent level determining unit 63 determines a predetermined overcurrent level based on these characteristics and the number of revolutions, and outputs the determined overcurrent level to the current comparing unit 64.

As described above, the current comparing unit 64 in FIG. 1 always compares the detected current value inputted from the current detecting unit 61 with the overcurrent level determined by the overcurrent level determining unit 63 based on FIG. 2 or FIG. 3. When the detected current value at a certain phase has reached the overcurrent level, an overcurrent detection signal is sent to the gate signal generating unit 65 so that all the semiconductor switching devices 41 to 46 of the inverter 40 are turned off by the gate signal generating unit 65 to thereby stop the inverter 40 in an emergency.

As shown in FIG. 2, in the background art, the overcurrent level is set at a predetermined value regardless of the number of revolutions of the motor M. On the contrary, in accordance with this embodiment, the overcurrent level is reduced as the number of revolutions increases in the constant output region of the motor M.

Therefore, the current of the motor M can be reduced when the output current of the inverter 40 exceeds the overcurrent level during high-speed rotation of the motor M to thereby stop the inverter 40 in an emergency. Thus, regenerative energy applied on the capacitor 30 is reduced so that there is no possibility that the voltage of the capacitor 30 will increase to break down the capacitor 30.

Figure 4:
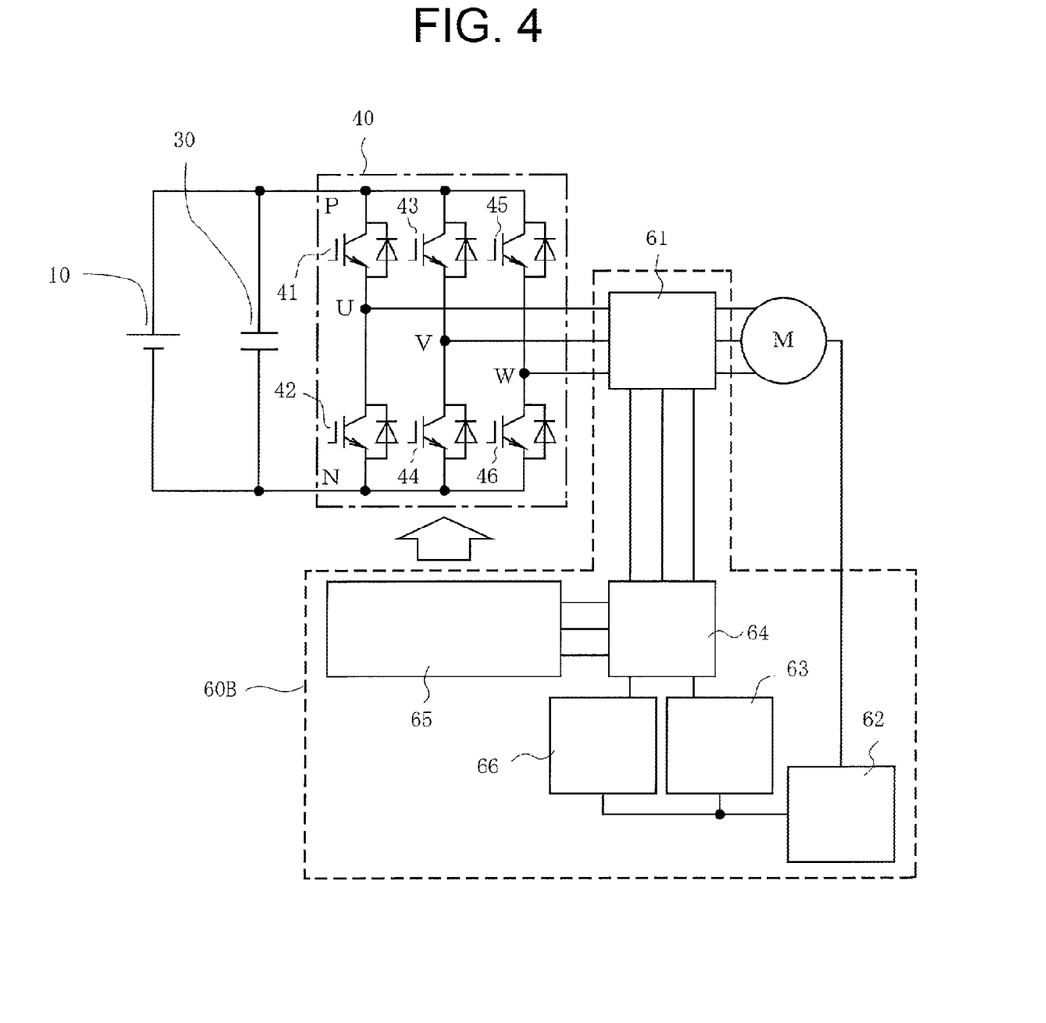
FIG. 4 is a circuit diagram showing a second embodiment of the invention.

Next, FIG. 4 is a circuit diagram showing a second embodiment of the invention.

The second embodiment is different from the first embodiment in that a current limit level determining unit 66 is added to a controller 60B. The output of the revolution number detecting unit 62 is applied to the overcurrent level determining unit 63 and the current limit level determining unit 66 and outputs of the overcurrent level determining unit 63 and the current limit level determining unit 66 are inputted to the current comparing unit 64. Incidentally, in the second embodiment, an estimated value of the number of revolutions or a commanded value of the number of revolutions may be inputted to the overcurrent level determining unit 63 and the current limit level determining unit 66 in place of the detected value of the number of revolutions outputted from the revolution number detecting unit 62.

Since the other configuration in FIG. 4 is the same as that in FIG. 1, constituent members having the same functions as those in FIG. 1 are referred to by the same signs as those in FIG. 1, and description thereof will be omitted.

The main part of the controller 60B can be achieved by a CPU or DSP and a predetermined program.

The current limit level determining unit 66 in FIG. 4 has a function of determining a current limit level in accordance with the number of revolutions of the motor M.

Figure 5:
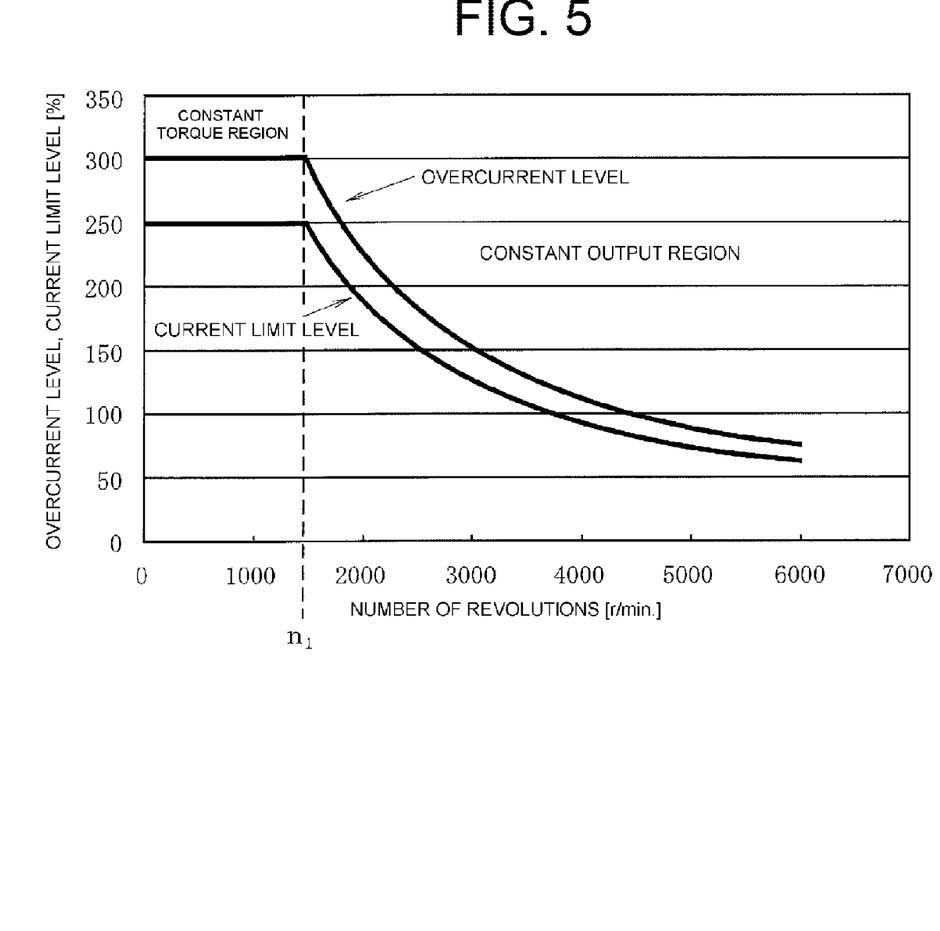
FIG. 5 is a graph showing the relation among the number of revolutions of a motor, an overcurrent level and a current limit level in the second embodiment.
Figure 6:
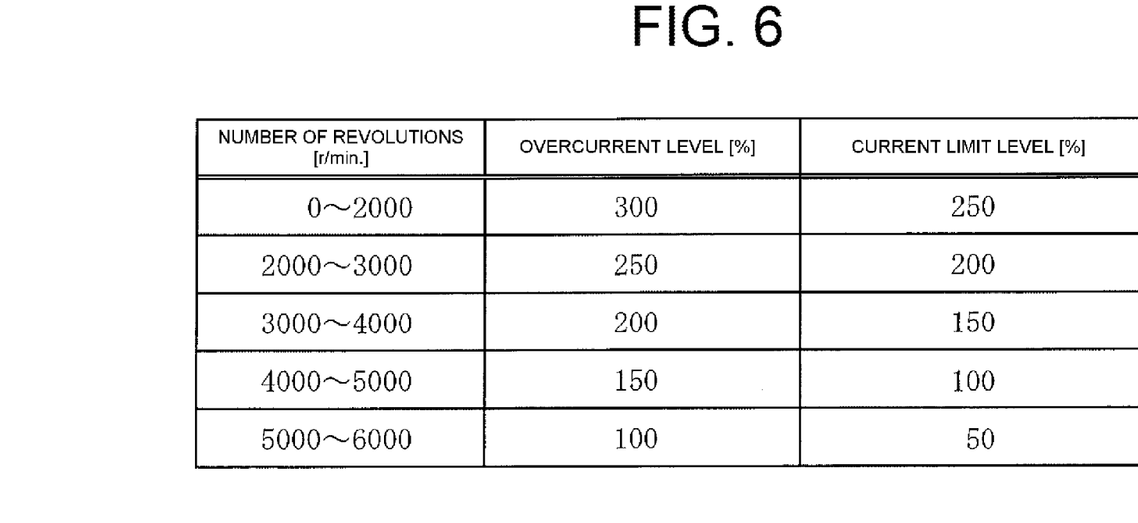
FIG. 6 is a table showing the relation among the number of revolutions of the motor, the overcurrent level and the current limit level in the second embodiment.

FIGS. 5 and 6 show the relation among the number of revolutions of the motor M, the overcurrent level and the current limit level in the second embodiment. In FIGS. 5 and 6, the relation between the number of revolutions of the motor M and the overcurrent level is the same as that in FIGS. 2 and 3.

The current limit level in FIG. 5 has a characteristic in which the current limit level is a constant value in the constant torque region of the motor M and decreases gradually as the number of revolutions increases in the constant output region. The current limit level is set to be lower than the overcurrent level in the whole range of the number of revolutions.

In addition, the characteristic shown in FIG. 6 is an example in which 250 [%] of the rated current is regarded as a current limit level in the revolution number range of 0 to 2000 [r/min.] and then the current limit level is reduced by 50[%] of the rated current whenever the number of revolutions increases by 1000 [r/min.].

In the same manner as in the first embodiment, the characteristics (the overcurrent level and the current limit level in accordance with the number of revolutions) shown in FIGS. 5 and 6 are stored in advance as numerical data or a table in a memory (not shown) provided in the controller 60B in FIG. 4. The overcurrent level determining unit 63 and the current limit level determining unit 66 outputs the overcurrent level and the current limit level determined by the number of revolutions of the motor M and the characteristics of FIGS. 5 and 6, to the current comparing unit 64.

The current comparing unit 64 always compares the detected current value inputted from the current detecting unit 61 with the overcurrent level determined by the overcurrent level determining unit 63 and with the current limit level determined by the current limit level determining unit 66. When the detected current value at a certain phase has reached the current limit level, a command is sent to the gate signal generating unit 65 to stop switching at the phase or to shorten the width of the gate pulse for turning on the semiconductor switching devices so that current limit operation is executed for limiting the size of the output current of the inverter 40 at the phase.

Further, when the detected current value at a certain phase inputted from the current detecting unit 61 has reached the overcurrent level, an overcurrent detection signal is sent to the gate signal generating unit 65 so that all the semiconductor switching devices 41 to 46 of the inverter 40 are turned off by the gate signal generating unit 65 to thereby stop the inverter 40 in an emergency.

According to the second embodiment, the current limit level determining unit 66 is made to function so that the current limit level decreases as the number of revolutions of the motor M increases. Therefore, an overcurrent can be prevented from flowing in the motor M when the inverter 40 stopped in an emergency during high-speed rotation of the motor M is then restarted.

Accordingly, it is possible to provide a power conversion apparatus most suitable to a drive system, such as a vehicle drive system for a hybrid automobile or an electric automobile, in which the current value may be small without requiring a large torque at the time of restart even when the motor M rotates at a high speed.

INDUSTRIAL APPLICABILITY

The power conversion apparatus according to the invention can be used not only for hybrid automobiles or electric automobiles but also for various drive systems using motors.

REFERENCE SIGNS LIST

10: DC power supply
30: capacitor
40: inverter
60A, 60B: controller
61: current detecting unit
62: revolution number detecting unit
63: overcurrent level determining unit
64: current comparing unit
65: gate signal generating unit
66: current limit level determining unit
M: motor

The invention claimed is:

1. A power conversion apparatus for driving an AC motor by using an inverter having a DC side to which a parallel circuit having a DC power supply and a capacitor is connected, wherein a controller for controlling semiconductor switching devices of the inverter includes:
    a current detecting unit which detects an output current of the inverter;
    an overcurrent level determining unit which determines an overcurrent level for stopping operation of the inverter in accordance with a value corresponding to a number of revolutions of the motor;
    a current comparing unit which compares a detected output current value of the inverter outputted from the current detecting unit with the overcurrent level determined by the overcurrent level determining unit; and
    a drive signal generating unit which generates a signal for turning off all the semiconductor switching devices of the inverter when the current comparing unit makes a determination that the detected output current value has reached the overcurrent level;
    wherein:
    the overcurrent level determined by the overcurrent level determining unit becomes lower in terms of value as the value corresponding to the number of revolutions becomes larger in a constant output region of the motor.

2. The power conversion apparatus of claim 1, wherein:
    the value corresponding to the number of revolutions of the motor is any one of a detected value of the number of revolutions, an estimated value of the number of revolutions or a commanded value of the number of revolutions.

3. The power conversion apparatus of claim 1, wherein:
    the value corresponding to the number of revolutions of the motor is any one of a detected value of the number of revolutions, an estimated value of the number of revolutions or a commanded value of the number of revolutions.

4. The power conversion apparatus of claim 1, wherein:
    the inverter and the motor form a vehicle drive system for a hybrid automobile or an electric automobile.

5. The power conversion apparatus of claim 1, wherein:
the inverter and the motor form a vehicle drive system for a hybrid automobile or an electric automobile.

6. The power conversion apparatus of claim 1, wherein: the motor is a permanent magnet synchronous motor.

7. The power conversion apparatus of claim 1, wherein:
the motor is a permanent magnet synchronous motor.

8. A power conversion apparatus for driving an AC motor by using an inverter having a DC side to which a parallel circuit having a DC power supply and a capacitor is connected, wherein a controller for controlling semiconductor switching devices of the inverter includes:
a current detecting unit which detects an output current of the inverter;
an overcurrent level determining unit which determines an overcurrent level for stopping operation of the inverter in accordance with a value corresponding to a number of revolutions of the motor;
a current limit level determining unit which determines a current limit level for limiting the output current of the inverter in accordance with the value corresponding to the number of revolutions of the motor;
a current comparing unit which compares a detected output current value of the inverter outputted from the current detecting unit with the overcurrent level determined by the overcurrent level determining unit, and which compares the detected output current value with the current limit level determined by the current limit level determining unit; and
a drive signal generating unit which generates a signal for turning off all the semiconductor switching devices of the inverter when the current comparing unit makes a determination that the detected output current value has reached the overcurrent level, and which generates a signal for limiting the output current of the inverter at a certain phase when the current comparing unit makes a determination that the detected output current value has reached the current limit level;
wherein:
the overcurrent level determined by the overcurrent level determining unit and the current limit level determined by the current limit level determining unit become lower in terms of value as the value corresponding to the number of revolutions becomes larger in a constant output region of the motor.

9. The power conversion apparatus of claim 8, wherein:
the current limit level is lower in terms of value than the overcurrent level in a whole range for the value corresponding to the number of revolutions of the motor.

10. The power conversion apparatus of claim 8, wherein:
the drive signal generating unit generates a signal for stopping switching at a certain phase of the inverter when the detected output current value at the phase has reached the current limit level.

11. The power conversion apparatus of claim 8, wherein:
the drive signal generating unit generates a signal for shortening a width of a pulse for turning on the semiconductor switching devices of the inverter at a certain phase when the detected output current value at the phase has reached the current limit level.

12. The power conversion apparatus of claim 8, wherein:
the overcurrent level determined by the overcurrent level determining unit becomes lower in terms of value as the value corresponding to the number of revolutions becomes larger in a constant output region of the motor.

13. The power conversion apparatus of claim 8, wherein:
the motor is a permanent magnet synchronous motor.

14. The power conversion apparatus of claim 8, wherein the overcurrent level and the current limit level in accordance with the value corresponding to the number of revolutions of the motor are stored in advance as numerical data in a memory of the controller.

15. The power conversion apparatus of claim 14, wherein the overcurrent level and the current limit level stored in advance as numerical data in the memory of the controller are defined as a plurality of values that decrease or increase in steps of a fixed size and correspond respectively to fixed ranges of the number of revolutions of the motor, and the steps decrease as the fixed ranges increase, or increase as the fixed ranges decrease.

16. An apparatus, comprising:
a current detecting device configured to detect a current; and
an overcurrent protection device configured to stop or inhibit an overcurrent condition based at least in part on the detected current and a motor speed;
wherein the overcurrent protection device is configured to lower a threshold for determining that an overcurrent has occurred in response to an increase in the motor speed; and
wherein the overcurrent protection device comprises:
a comparison device configured to compare the detected current to a current threshold and output a comparison signal; and
an overcurrent determination device configured to supply a range of current thresholds to the comparison device for comparison with the detected current;
wherein values in the range of current thresholds decrease with increasing values of the motor speed.

17. The apparatus of claim 16, wherein the overcurrent protection device further comprises:
an overcurrent inhibiting device configured to stop or inhibit a current in response to the comparison signal indicating that an overcurrent has occurred.

18. The apparatus of claim 17, wherein the motor includes a three-phase AC motor.

19. The apparatus of claim 18, wherein the overcurrent inhibiting device is configured to stop or inhibit the current by turning off at least one switch of an inverter that drives the motor.

* * * * *